United States Patent
Haase et al.

(10) Patent No.: US 8,299,903 B2
(45) Date of Patent: *Oct. 30, 2012

(54) SCREW-IN LED LIGHT AND SOUND BULB

(76) Inventors: Edward H Haase, La Qunta, CA (US); John Kemper Pasley, San Diego, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 12/426,064

(22) Filed: Apr. 17, 2009

(65) Prior Publication Data

US 2009/0207607 A1 Aug. 20, 2009

Related U.S. Application Data

(63) Continuation-in-part of application No. 12/072,606, filed on Feb. 28, 2008, now Pat. No. 7,817,016, which is a continuation-in-part of application No. 11/386,472, filed on Mar. 23, 2006, now Pat. No. 7,535,341.

(51) Int. Cl.
*G08B 27/00* (2006.01)

(52) U.S. Cl. ............... 340/326; 340/539.1; 340/539.19; 340/691.1; 340/693.5; 340/693.6; 340/693.11; 340/332; 362/234; 362/86; 362/253; 315/57; 315/209 R (58) Field of Classification Search ............... 340/326, 340/539.1, 539.19, 539.22, 691.1, 692, 693.5, 340/693.6, 693.9, 693.11, 693.12, 825.36, 340/332; 362/234, 86, 253; 315/57, 209 R, 315/255, 362, 58
See application file for complete search history.

(56) References Cited

U.S. PATENT DOCUMENTS

| | | | |
|---|---|---|---|
| 1,272,843 A | 7/1918 | Pape | |
| 2,083,753 A | 6/1937 | Turner | |
| 2,501,968 A | 3/1950 | Sassin | |
| 2,924,661 A | 2/1960 | Messeas, Jr. | |
| 3,023,830 A | 3/1962 | Hammes | |
| 3,194,952 A | 7/1965 | Wells | |
| 4,214,298 A | 7/1980 | Propst | |
| 4,433,363 A | 2/1984 | Weber | |
| 4,528,620 A | 7/1985 | Weber | |
| 4,559,584 A | 12/1985 | Kuwahata | |
| 4,704,664 A * | 11/1987 | McNair | 362/225 |
| 4,776,018 A | 10/1988 | Cordier | |
| 5,410,735 A * | 4/1995 | Borchardt et al. | 455/42 |
| 5,980,057 A * | 11/1999 | Christie | 362/86 |
| 6,445,733 B1 * | 9/2002 | Zuranski et al. | 375/231 |
| 6,558,032 B2 | 5/2003 | Kondo et al. | |
| 6,748,096 B2 | 6/2004 | Chuang | |
| 7,029,150 B2 | 4/2006 | Finch | |

(Continued)

*Primary Examiner* — Daryl Pope
(74) *Attorney, Agent, or Firm* — Kirk A. Buhler; Buhler & Associates (57) ABSTRACT

A combination light and sound producing fixture and combination screw-in light with speakers element is disclosed where the fixture is installed in a wall or ceiling or on a wall or ceiling. The light bulb/speaker can be screwed or secured into a standard light bulb socket. The sound producing elements is a coaxial arrangement of speakers having a low frequency transducer and one or more high frequency transducers that can be directed to emit sound in a particular direction. The fixture or bulb may further include digital signal processing to modify the sound to account for obstructions in or near the fixture. The surface of the sound transducer can be reflective in nature to provide focusing or diffusion of the light from the lighting elements. The lighting elements are incandescent, fluorescent or low voltage LED type that may include adjustment for lighting intensity and color.

18 Claims, 8 Drawing Sheets

U.S. PATENT DOCUMENTS

| | | | |
|---|---|---|---|
| 7,066,613 B2 * | 6/2006 | Vishwamitra | 362/86 |
| 7,438,447 B2 | 10/2008 | Holder et al. | |
| 7,455,435 B2 | 11/2008 | Mathews et al. | |
| 7,479,662 B2 | 1/2009 | Soules et al. | |
| 2003/0021103 A1 * | 1/2003 | Christie | 362/86 |
| 2004/0105264 A1 * | 6/2004 | Spero | 362/276 |
| 2005/0024857 A1 * | 2/2005 | Vishwamitra | 362/152 |
| 2005/0259446 A1 * | 11/2005 | Smith et al. | 362/641 |
| 2007/0064433 A1 | 3/2007 | Wright | |
| 2008/0165527 A1 * | 7/2008 | VanderSchuit | 362/133 |
| 2008/0225510 A1 * | 9/2008 | Rocha | 362/86 |
| 2008/0298045 A1 | 12/2008 | Wright | |
| 2009/0034778 A1 * | 2/2009 | Chi | 381/394 |
| 2009/0196016 A1 * | 8/2009 | Massara et al. | 362/86 |

* cited by examiner

SCREW-IN LED LIGHT AND SOUND BULB

CROSS REFERENCE TO RELATED APPLICATION

This application is a continuation-in-part of applicant's co-pending application Ser. No. 12/072,606 filed Feb. 8, 2008 which is a continuation in part of Ser. No. 11/386,472 filed Mar. 23, 2006 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to a screw-in light bulb with integrated speakers. More particularly, the present invention relates to a screw-in light bulb having a plurality of LED lighting elements where the lighting elements are placed around the screw-in light bulb housing to distribute light in an even distribution to simulate or improve the light diffusion found in an incandescent screw-in light bulb. The lighting elements are placed in combination with speakers in a single unit. The screw-in unit allows a person to place speakers within existing lighting socket to provide sound or surround sound without wiring. The existing light socket provides power for the light and the signal for the sound is either embedded onto the power to the fixture or is received from a wireless transmitter.

2. Description of Related Art Including Information Disclosed Under 37 CFR 1.97 and 1.98:

Most houses constructed today include one or more can style lighting fixtures were the lighting fixture is recessed into a wall or ceiling. Many house is also include an intercom or speakers that are also mounted in the wall or ceiling. The installation of the lighting and sound are usually provided by different tradesman during the construction of the house. Some patents have been issued on products to try to combine the lighting and sound as a single element.

LED's have continued to improve in the amount of illumination that they can emit with multiple lighting elements within a single powered chip. The light from these elements shines in a fairly directional manner. The directional manner is undesirable in a number of installations where a more eve omni-directional light is preferred.

A lamp produces light in three primary ways: First, light is nearly always emitted through a hole in the top of a shade, projecting light onto the ceiling and sometimes washing nearby surfaces with a conical light pattern. Second, Light is directed downward (sometimes with the aid of a shade) to illuminate an area which is generally more confined and might be most often used for reading or close hand work such as sewing. Third, a portion of the light is ambient in nature and is used most often to illuminate the shade, making it glow, often changing the color and character of the light while highlighting (sometimes) aesthetic aspects of the shade.

It is the third which is hard to accomplish with LEDs. It is difficult to get an even wash of light across a lamp shade and thereby provide the necessary glow. The diffusion of light from LED's is further exacerbated with the placement of speakers on a light bulb where high frequency speakers also emit directional sound.

U.S. Pat. No. 1,272,843 issued to H. G. Pape on Jul. 6, 1918, U.S. Pat. No. 4,433,363 issued on Feb. 21, 1984 and 4,528,620 issued on Jul. 9, 1985 both issued to Weber, nations sound lighting fixture that is suspended free ceiling. All three of these issued patents disclose a sound producing element combined with incandescent lighting. None of these three patents disclose that the lighting and sound fixture is for recessed ceiling or walled installation or for mounting on a wall or ceiling nor do they disclose using low voltage lighting, a wireless receiver or digital signal processing to account for placement or fixture construction. The orientation of the sound producing elements is also not adjustable to direct sound waves to a particular location.

U.S. Pat. No. 4,776,018 issued to Cordier on Oct. 4, 1988 and U.S. Pat. No. 5,980,057 issued to Cristie on Nov. 9, 1999 both disclose screw-in combination lighting/sound fixtures. Both of these two patents are for a standalone screw in lighting fixture that can be installed inside an existing lights socket and include a wireless receiver for receiving audio signal. Neither of these two patents provide a recessed lighting fixture they're simply lighting elements for installation in an existing fixture and do not include digital signal processing to account for placement or fixture construction. The sound producing elements eight oriented to direct sound waves to a particular unidirectional location.

U.S. Pat. No. 2,083,753 issue to A. R. Turner on Jun. 15, 1937 and U.S. Pat. No. 4,953,584 issued to Kawahata et al. on Dec. 17, 1985 both disclose lighting fixtures for mounting on the ceiling. In the case of Turner, a portion of the fixture extensible below the ceiling and above the ceiling. In the case of Kawahata et al. fixture is mounted in the ceiling. Neither of these two patents discloses using low voltage lighting within the fixture. The orientation of the sound producing element is fixed within the fixture and cannot be oriented to direct sound ways to particular location. Neither of these two patents including digital signal processing to account for placement or construction of the fixture.

U.S. Pat. No. 7,455,435 Issued Nov. 25, 2008 to David K. Mathews et al., discloses a High Speed Data Interface to the AC Power Line through a Standard Light Bulb Socket. In this application a speaker is threaded into a light socket and the light bulb is then screwed into the speaker. This is not a single integrated speaker and light, nor does it provide omni-directional light.

What is needed is a combination lighting and sound bulb that is screwed directly into a standard light bulb socket. The illumination is provided from efficient LED elements and the light is diffused to provide even transmission of light that would be similar to an incandescent light bulb. The proposed application provides these features and functions in a complete package that can be installed in nearly any standard light bulb socket.

BRIEF SUMMARY OF THE INVENTION

It is an object of the combination lighting sound fixture bulb to provide a lighting element that disperses illumination away from the socket bottom to shine away from the connector. This lighting is most commonly found in incandescent light bulbs. This light is directed to send or project light out of the top of a light shade and onto a ceiling and onto walls or objects near the lamp.

It is another object of the combination lighting and sound bulb to provide a light that is directed downward in the direction of the base or socket side of the bulb. This lighting illuminates the area under a lamp shade where the illumination is useful for reading or close hand work such as sewing.

It is another object of the combination lighting and sound bulb to provide lenses and or reflective surface that are configured to evenly reflect the illumination away and around from a linear light path of a single or multiple element LED lighting source.

It is another object of the combination lighting and sound bulb to provide a light that is ambient in nature and is used most often to illuminate the shade, making it glow, often changing the color and character of the light while highlighting (sometimes) aesthetic aspects of the shade.

It is another object of the combination lighting and sound bulb to provide the lighting and sound bulb that is installed in the same manner as a conventional incandescent light bulb by unscrewing an incandescent bulb and screwing in the light and sound bulb. This allows installation with little or no training or licensing.

It is an object of the combination lighting and sound bulb to provide lighting that is low voltage and can be installed by both a licensed electrical contractor as well as a sound installation contractor. This provides the greatest flexibility for installation.

It is another object of the combination lighting and sound bulb to provide the multiple sound producing elements where some of the sound producing elements produced low frequency sound waves and others produce high frequency sound waves. The light and sound bulb may have one Low frequency transducer (woofer) multiple mid-range or high frequency (tweeter) transducers. These speakers can be arranged in a co-axial, opposed and or orthogonal orientations or in an on or off axis orientation.

It is another object of the combination lighting and sound bulb to provide the surface of the sound producing elements with the properties that allow the light to be reflected off the surface of the sound producing element(s) to direct the light into the room. The surface can alternatively diffuse the light to provide for more even lighting.

It is another object of the combination lighting and sound bulb to provide the signal to the sound producing elements as a wired connection or as a wireless connection. The wireless connection may also include a repeater that can increase the distance that the wireless signal is sent and received.

It is another object of the combination lighting and sound bulb to allow for interchangeable lighting elements. The lighting elements can include LED, incandescent, fluorescent, halogen or a variety of other lighting elements that are interchangeable. Lighting elements may also be filtered to provide lighting of different colors and may also be dimmable. A plurality of lighting elements can be used within the bulb without compromising the quality of sound that is produced. The lighting elements can vary intensity and color based upon the sound that is emitting from the speaker(s).

It is another object of the combination lighting and sound bulb for the fixture to be configured in a light bulb that can be screwed into a standard light socket. In this configuration the 110 voltage may include a digital signal. The voltage is converted for use with the LED lights and either the digital signal is amplified and transmitted to the speakers or the signal is wirelessly received, amplified and transmitted to the speakers. This light and sound bulb in this configuration eliminates visible speakers and places the sound in light fixtures that already exist within a room.

It is still another object of the combination lighting and sound bulb to include digital signal processing to account for construction of the fixture location of the fixture, placement of the bulb and or other characteristics. The digital signal processing may also include a notch filter for canceling out 60 cycle noise from AC power lines.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
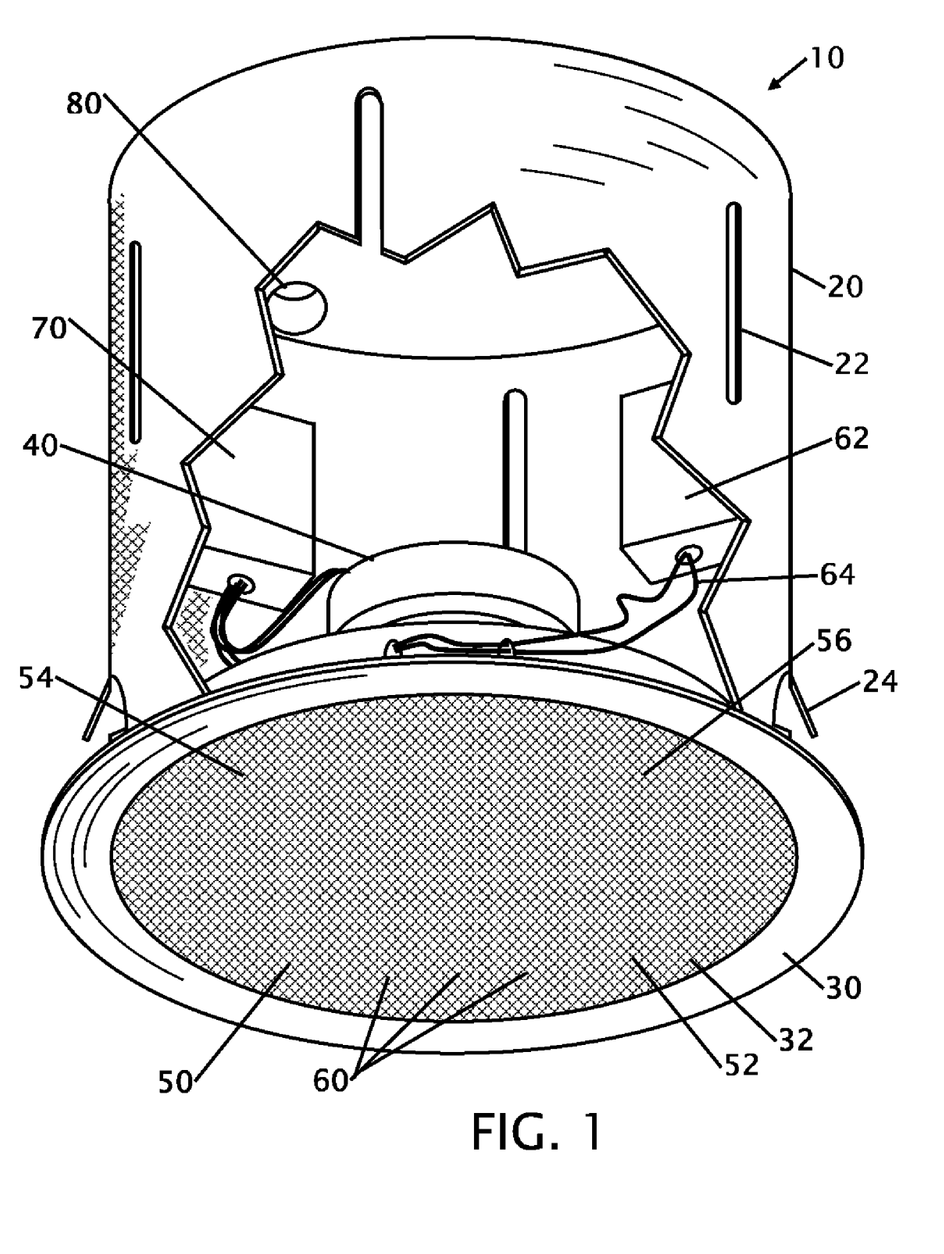
FIG. 1 shows an isometric view of the combination light and sound fixture before installation into a ceiling or wall.

FIG. 1 shows an isometric view of the combination light and sound fixture 10 before installation into a ceiling or wall. In this preferred embodiment the fixture 10 is in a cylindrical can configuration 20 where the can has an opening at one end for emission of the light and sound, and a closed end where the fixture exists in a wall or ceiling. In this preferred embodiment the fixture is fabricated from metal as would be found in recessed lighting fixtures. Tabs 24 or other similar mounting devices are used to secure the fixture in the wall or ceiling. Slots 22 may be alternatively used to mount the fixture on a wall or ceiling. These slots allow the installation depth to be adjustable after the fixture is installed and after the finished wall or ceiling thickness has been established. A lip 30 surrounds the outer edge of the fixture to provide a finished surface for the fixture to cover the edge of the wall or ceiling. One or more conduit junction(s) 80 allow for the passage of electrical and or sound connection wires to be brought into the fixture. The components that are placed inside the fixture allow sound and light to be transmitted out of the fixture shell 20.

Inside the fixture at least one sound emitting element is located. In this preferred embodiment multiple sound emitting elements are installed. A low frequency sound emitting element 40 (woofer) is placed within the fixture and oriented in an outward firing arrangement. Generally the woofer produces sound from about 20 Hz to 1 KHz. The woofer is oriented in an outward firing orientation because it produces low frequency sound waves that are generally omni-directional and travel in all directions. For high frequency sound emitting elements (tweeters) 50, 52, 54 and 56 located below the woofer 40. The high frequency sound emitting elements tend to be directional and emit sound waves in the direction they are oriented. Generally the tweeter(s) produce sound from about 800 Hz to 20 KHz. Because the tweeters are directional, multiple tweeters are used in the fixture and are arranged to emit sound in different directions. The arrangement of the tweeter(s) can be a fixed 30 degree outward orientation or the tweeters can be located on a gimbaled holder that allows the orientation of each tweeter to be adjusted. In this preferred embodiment four tweeters are used, but the fixture could be made using just one tweeter or more that four. It is further contemplated that a single wide range speaker can be used in the fixture. In another contemplated embodiment a third mid range speaker is utilized to provide improved sound. The outside facing surface of the woofer and some or all of the tweeter(s) is coated with a highly reflective surface to reflect light.

The reflective surface of the sound emitting components reflects light from lighting elements 60. In the preferred embodiment multiple LED lighting elements are placed in a ring within the fixture. LED lighting is used because it is easily configured to provide even lighting, LED lights operate at a lower voltage, LED lights are more efficient than most other forms of lighting, and LED's produce light with minimal heat. A total of 9 LED's operating at 1 watt of power will produce the same brightness as a 60 watt incandescent light bulb. The operation life expectancy of LED's is 100,000 hours resulting in 10 to 20 times longer life than a standard incandescent light bulb. While the preferred illumination element is LED's, other forms of illumination include but are not limited to incandescent, fluorescent, neon and halogen. The low operational voltage of LED lights allows power to be supplied to the fixture at a voltage that might not require the installer to be a licensed electrician thereby allowing the fixture to be installed by the same person that installs the speaker connections. Title 24 of the UBC requires high efficiency lighting is required for 50% or more of the illumination in a room depending upon the room being illuminated. The need for increased efficiency is an important consideration for both energy efficiency and a reduction of heat that may require air conditioning to offset the heat produced by inefficient lighting. While the LED's are powered by lower voltage, high voltage can be brought into the fixture and the voltage reduced with a transformer or power placed in a junction box 62 located within the fixture (shown) or external to the fixture. Power to the lighting elements 60 is brought 64 from the electrical junction box 62 to the LED's.

The power converter reduces the incoming voltage (120VAC) into a lower voltage of about 3.1 volts to operate the LED's. The operating voltage can include the audio signal superimposed on the power lines, or can be brought into the fixture from a separate electrical connection and then into a separate audio junction box 70. The audio junction box can include a Digital Signal Processor (DSP) to adjust the sound from the speakers to produce anything from a flat sound to surround sound. The user can further use the DSP to switch between omni-directional usages to facilitate distributed audio and also THX home theater applications. The DSP further can filter out 60 cycle noise to reduce or eliminate the 60 cycle noise from being transmitted out of the speakers. A screen 32 is shown covering the exposed surface of the fixture 10. The covering is constructed to allow the passage of both light and sound from the fixture.

In another contemplated embodiment the tweeters can extend from within the fixture to below the fixture as shown and described in FIG. 3 to improve the sound. In a number of installations it is not desirable for the sound to be heard in other rooms and to combat this issue sound insulation is placed around the outside of the fixture to reduce sound from being heard in other rooms where the sound is not desired.

Figure 2:
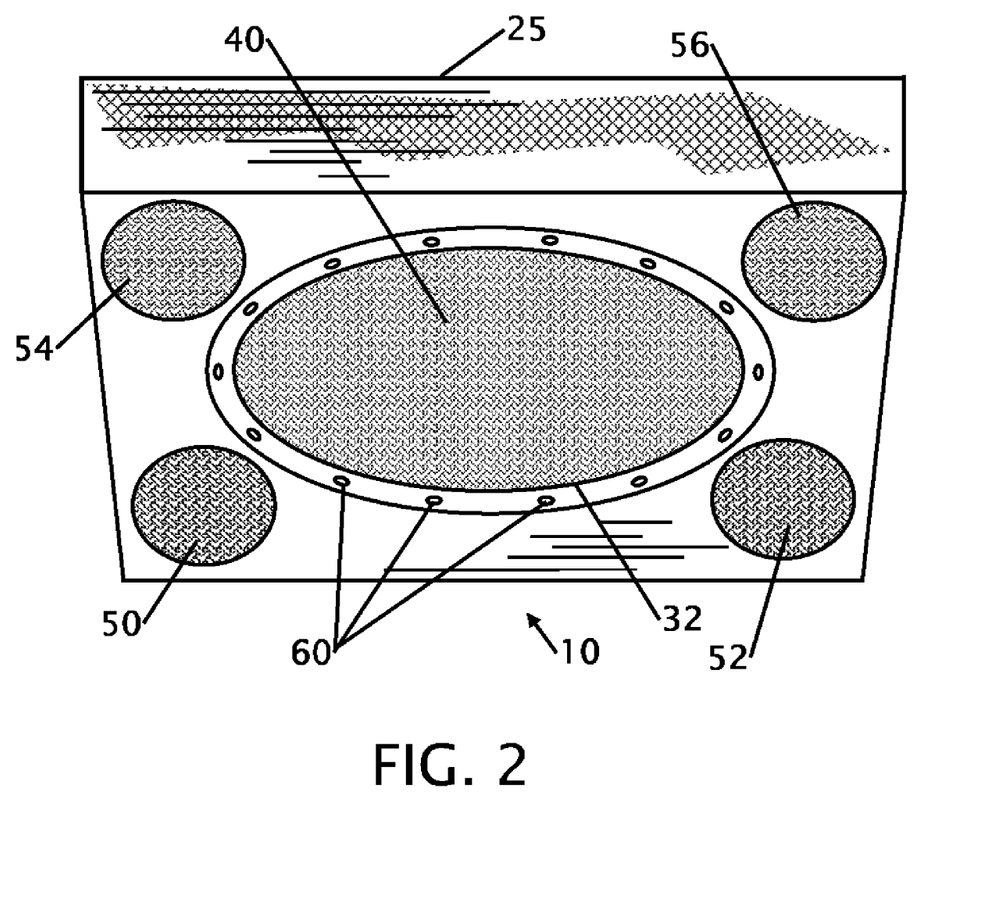
FIG. 2 shows an isometric view of a surface mounted combination light and sound fixture.

FIG. 2 shows an isometric view of a surface mounted combination light and sound fixture 10. In this contemplated embodiment the fixture is configured as a surface mount fixture to give the appearance of a retro style lighting fixture. The enclosure 25 is shown here in a square or rectangular configuration, but other shapes are contemplated that provide the same or similar appearance to lighting fixtures that may be present in older homes. In this figure separate covering 32 exist over each of the speakers. The LED lighting 60 exists around the central woofer 40. While this figure shows separate coverings over each speaker it is contemplated that a single cover can exist over all the sound emitting elements as well as over the light producing elements 60. Four separate mid/high frequency tweeters 50, 52, 54, and 56 exist on the corners of the fixture and are oriented in different directions to provide a more even distribution of higher frequency sounds. The tweeters can be positioned in fixed orientations or can be attached to individual gimbals where they can be individually oriented. As an example, if the fixture is located near a wall, two of the tweeters can be oriented to send sound diagonally with the wall, and the other two tweeters can be oriented to send sound out into the room.

Figure 3:
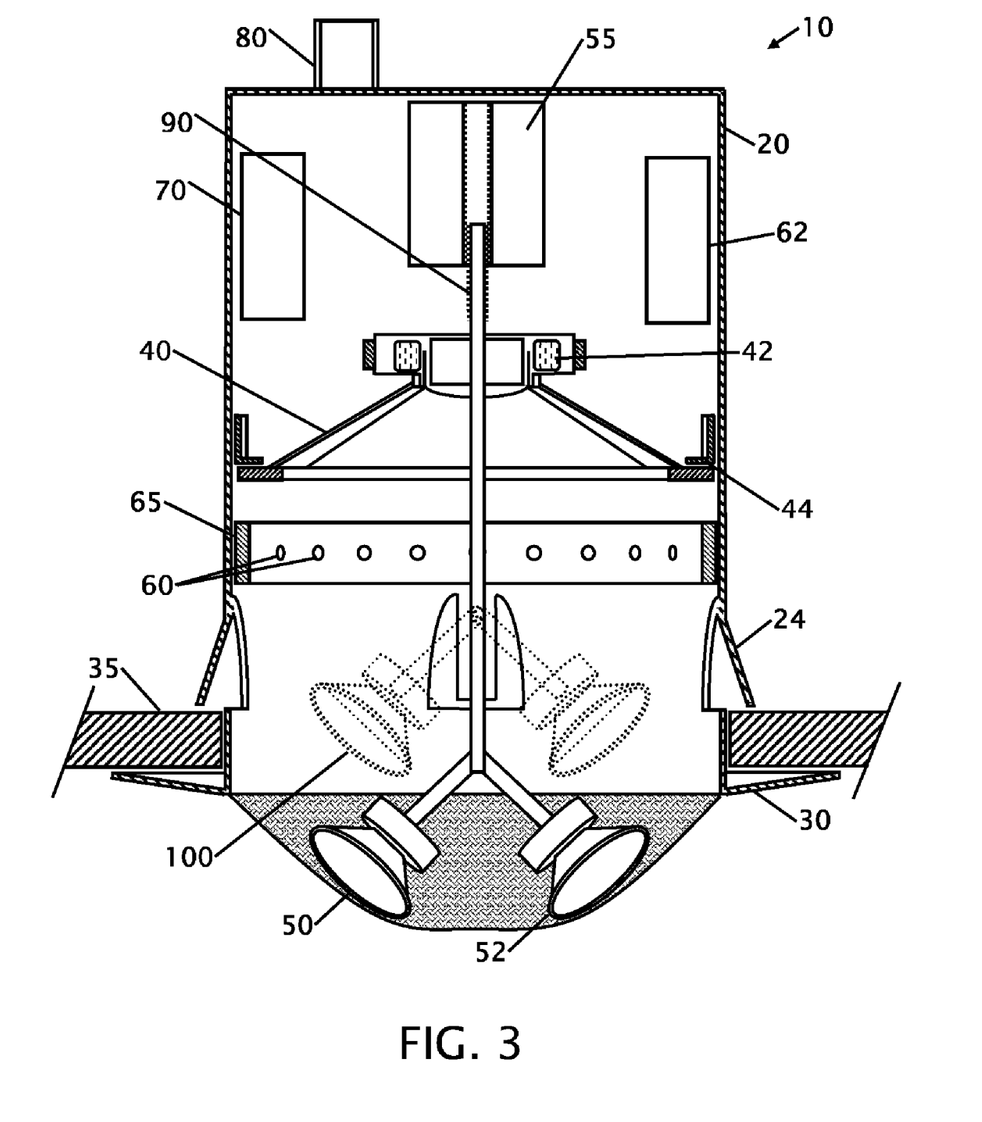
FIG. 3 shows a cross sectional view of the combination light and sound fixture with some of the sound producing elements extended below the height of the ceiling.

FIG. 3 shows a cross sectional view of the combination light and sound fixture 10 with some of the sound producing elements extended below the height of the ceiling. This configuration shows the fixture with the mid/high frequency sound producing elements existing within the fixture at 100, and also extended below the lip of the fixture 50 and 52. The mid/high frequency sound transducers are moved outside of the fixture to enhance the quality of the sound that may be muted when they operate within the fixture. A drive mechanism 55 moves the transducers inside and outside of the fixture using threads 90 or other movement mechanism(s). In the preferred embodiment the transducers are moved with a mechanical drive mechanism, but solenoids or other mechanical devices are contemplated. In the embodiment shown the transducers are linearly translated, but alternative movement systems are contemplated where the transducers are hinged or pivot to move them in and out of the fixture. A flexible covering 34 covers the outfacing surface of the fixture and when the transducers are lowered, the flexible covering stretches to accommodate the transducers. The flexible covering is removable to allow access to the interior of the fixture for replacement or servicing of the transducers, drive mechanism and or the lighting elements 60.

The fixture is shown in a circular can 20 configuration but may also exist as a square or rectangular can. The fixture is shown recessed in a wall or ceiling with drywall 35 or sheet rock holding the fixture in location. Tabs 24 retain the fixture in position on the wall or ceiling sandwiching the drywall with fascia ring 30 located on the visible side of the fixture.

The low frequency transducer 40 is supported 44 in the fixture and the position or depth of this transducer may be manually positioned. All the transducers are typical construction for speakers including a coil 42, piezo or similar mechanism to produce the sound. A ring 65 of lighting elements 60 is shown inside the fixture. This ring of lighting elements is replaceable to allow for upgrading or changing lighting elements in the future. The outside facing surface of the woofer and some or the entire tweeter is coated with a highly reflective surface to reflect light outside the fixture.

The LED's are powered by lower voltage, high voltage can be brought into the fixture and the voltage reduced with a power converter placed in a junction box 62 located within the fixture (shown) or external to the fixture. Power to the lighting elements 60 is brought through electrical conduit connection 80 to the electrical junction box 62 to the LED's.

Figure 4:
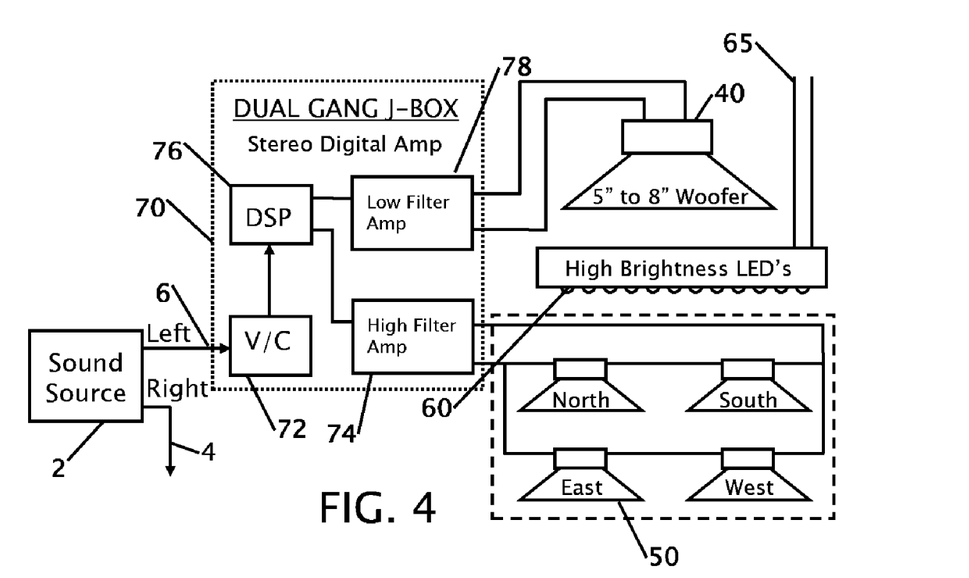
FIG. 4 shows a block diagram of the combination lighting and sound fixture.

The power converter reduced the incoming voltage (120VAC) into a lower voltage of about 3.1 volts to operate the LED's. The operating voltage can include the audio signal superimposed on the power lines, or can be brought into the fixture from a separate electrical connection and then into a separate, audio, junction box 70. The audio junction box can include a Digital Signal Processor (DSP) to adjust the sound from the speakers to produce anything from a flat sound to surround sound. The user can further use the DSP to switch between omni-directional usage to facilitate distributed audio and also THX home theater applications. The DSP further can filter out 60 cycle noise to reduce or eliminate the 60 cycle noise from being transmitted out of the speakers. The junction box 70 may house a wireless receiver for the audio signal with an optional repeater that can extend the distance the wireless signal is transmitted FIG. 4 shows a block diagram of the combination lighting and sound fixture. The sound source 2 in this figure shows only a left and right signal output that might be found in a 2.1 channel audio system, but other systems with additional audio signal such as 4.1 channels or more system(s) will operate in a similar method. The two channels in this example are left 6 and right 4. Only the left channel is shown in this figure for simplicity. The channel is sent to a Dual Gang Junction Box 70 that includes several components including; a volume control 72 that sets the volume that will be emitted from the audio transducer; a digital signal processing module 76 (DSP) to adjust the sound from the speakers to produce anything from a flat sound to surround sound. The user can further use the DSP to switch between omni-directional usage to facilitate distributed audio and also THX home theater applications. The DSP further filters out 60 cycle noise to reduce or eliminate the 60 cycle noise from being transmitted out of the speakers; and a Low Filter Amplifier 78; and a High Filter Amplifier. The signal from the Low Filter Amplifier drives the low frequency transducer 40, while the High Filter Amplifier 74 drives one or more mid/high frequency transducers 50. The mid/high frequency transducers are labeled in this figure as North, South, East and West indicating the proposed orientation of the speakers.

Power connection 65 supplies power to the array of high brightness LED's 60. The LED's can be filtered with fixed or removable light filters to alter or tune the color of the illumination. It is also contemplated that the LED's can include multi-colored LED's and the color of the lighting can be changed or altered by adjusting the intensity of the different colored LED's. It is further contemplated that the lighting elements can vary intensity and color based upon the sound that is emitting from the speaker(s).

Figure 5:
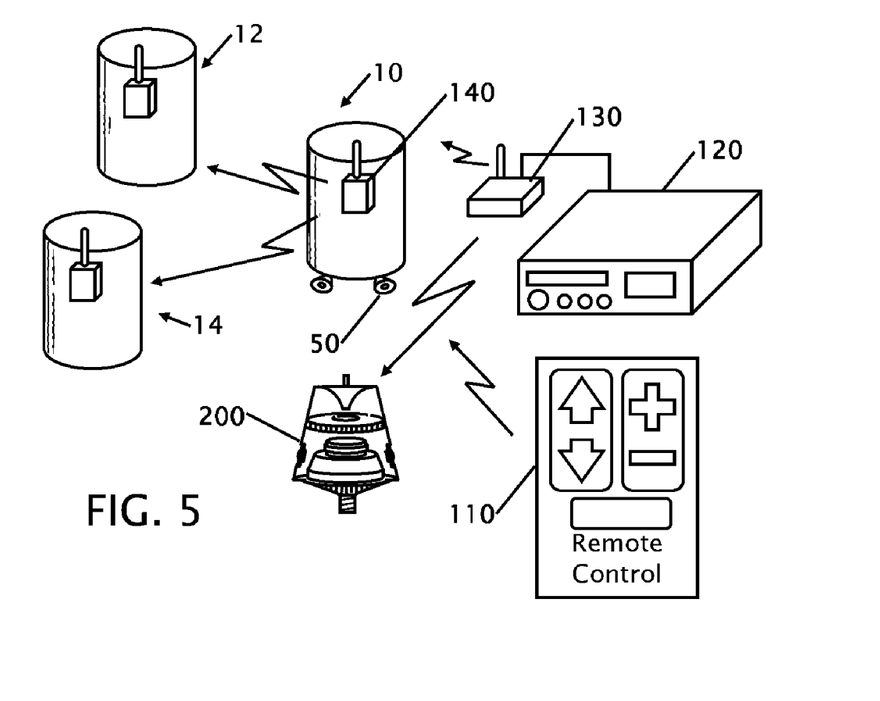
FIG. 5 shows a block diagram of the combination lighting and sound fixture with wireless controls for adjustment and signal repeating.

FIG. 5 shows a block diagram of the combination lighting and sound fixture with wireless controls for adjustment and signal repeating. The signal source 120 in this figure is a stereo connected to a wireless transmitter 130. The transmitter 130 sends a wireless signal to the receiver 140 placed on or within fixture 10. The fixture 10 utilizes the signal to emit sound. The receiver 140 may include a repeater that sends the signal to other fixtures 12, 14 and 200 that emit the sound and may further also have repeaters that send the signal to additional fixtures. A handheld or wall mounted control unit 110 controls the volume and or tone from one or more fixtures. This unit can also adjust the intensity or color of the illumination and or extend/retract the sound emitters 50 from the fixture(s).

Figures 6, 7:
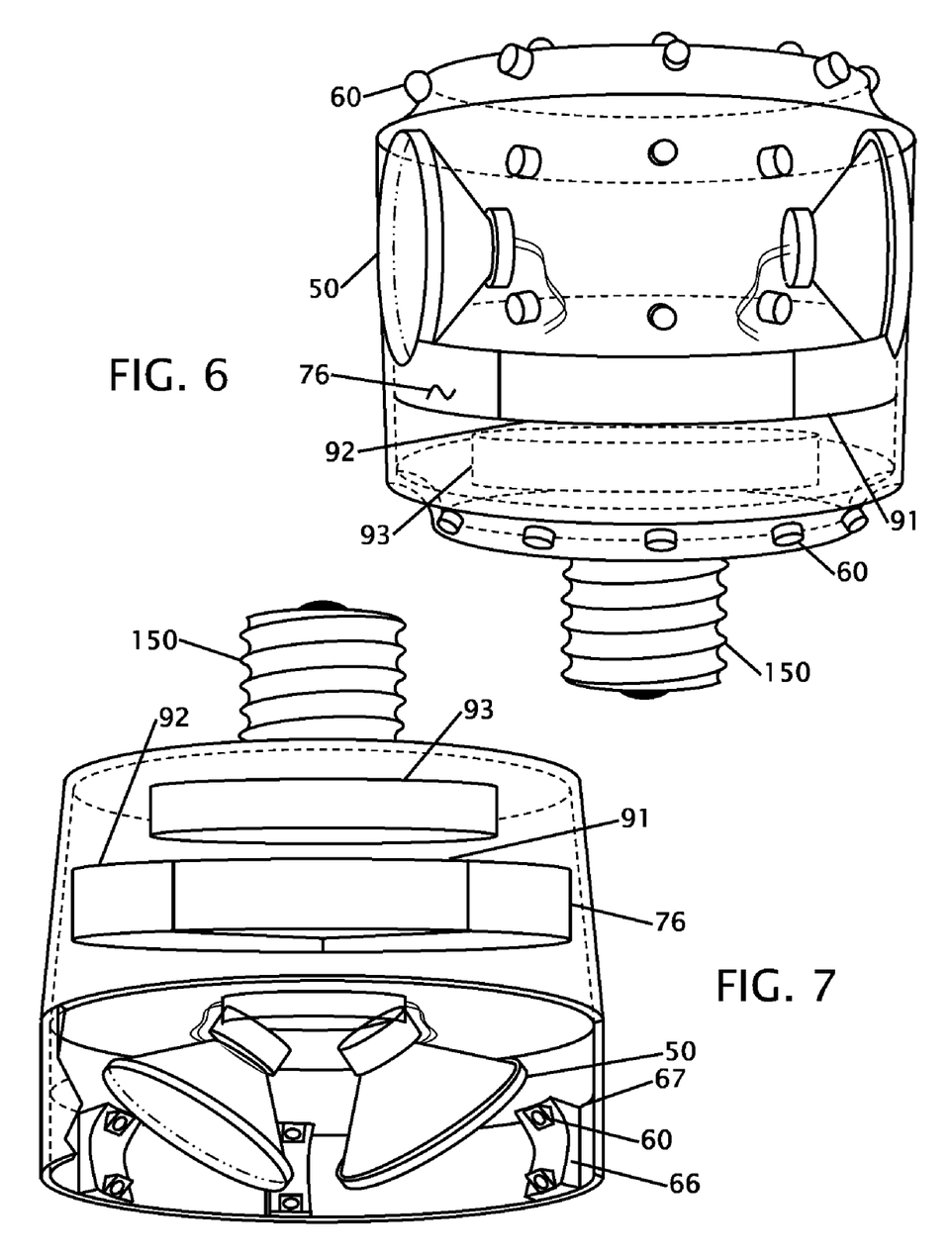
FIG. 6 shows a combination light bulb speaker configured to replace a standard light bulb.
FIG. 7 shows a combination light bulb and speaker configured to replace a flood type light bulb.

FIG. 6 shows a combination light bulb speaker configured to replace a standard light bulb. FIG. 7 shows a combination light bulb and speaker configured to replace a flood type light bulb. Both of these figures show light bulbs with illumination provided by a plurality of LED lights 60 and speakers 50 in the same light bulb. These are both configured have a base 150 for installation into existing light bulb sockets. The threaded base is configured to accommodate commonly available female sockets that are known as mogul base, but may be intermittent, medium, candelabra, bayonet or a pin type base. In the preferred embodiment the threaded base 150 is commonly called a medium base however the screw in fitting may be designed to "snap on and off" and interchange with other standard connectors. A low voltage transformer 93 or other power converter provides voltage to both the LED's and the sound processing system.

The product shown in FIG. 7 is designed to fit into a standard "downlight" lighting fixture. Approximate dimensions are: cylindrical 6" diameter and 5.5" depth. A plurality of speakers 50 are used and in the preferred embodiment four 2" to 2.5" drivers in a north, south, east, west configuration. More expensive designs would use a tweeter probably ½" diameter. Drivers would most likely use alnico magnets or whatever is strongest and smallest these days.

The lighting/speaker unit will contain a small amplifier 92. It will also contain a "power line decode" module 76 (or wireless receiver) and a power supply that is voltage/current optimized to power both the LEDs 60 and the amplifier 92. The unit will be controlled by a remote control (volume up/down, on-off for both light and speaker) (110 from FIG. 5), which may be dockable in a "light switch replaceable" module. It is also contemplated that the LED's 60 can be made with multi-colored LED's not only change the intensity of the lights but also the color. A signal capture 91 is either a filter that separates the audio signal from the power line or a wireless receiver.

A "power line feed" unit (Not shown) converts the pre-out signal from the home theater processor to power line (or wireless) and plugged into the house wiring. It would attach to the processor via RCA jacks. Initially the signal processing would include some signal (DSP) processing to enhance both bass and psycho acoustic bass frequencies. The whole system would be plug and play.

The lighting portion 66 is presently conceived as an adjustable ring 67 that pivots in much the same fashion as a tweeter except that it is open in the middle and compression fits into the perimeter of the speaker housing just below the drivers. This piece must be interchangeable and removable by a consumer. It is anticipate that as few as 4 to as many as 20 or more LEDs 60 of "super bright" nature are used to provide the illumination. Since LEDs 60 are highly directional the placement and adjustability of the LED's 60 provides some focusing and or dispersion of the light. The housing can also be coated with a "highly reflective" material to aid in dispersion or focusing of the light. In FIG. 6 the LED's 60 are strategically placed around the product to provide illumination in all directions to simulate an incandescent light bulb.

Figure 8:
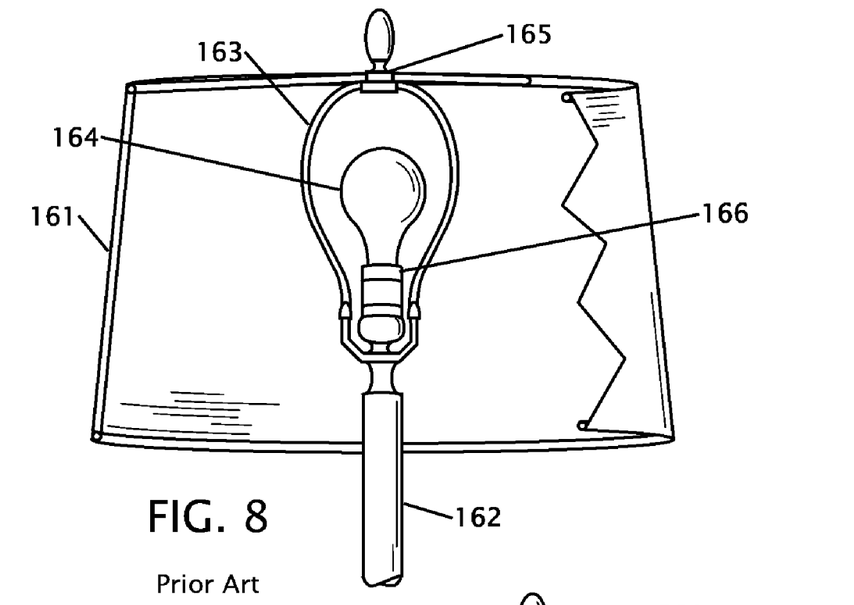
FIG. 8 shows a prior art lamp with an incandescent light bulb.

FIG. 8 shows a prior art lamp with an incandescent light bulb. This is a typical prior art arrangement of an incandescent light 164 screwed into a socket base 166. The base has support rods 163 that connect the structural lamp base or fixture 162 to the nut 165 that supports the shade 161. The support member 163 is necessary because the prior art incandescent bulb creates significant heat and lacks structural rigidity to support the lamp shade 161.

Figure 9:
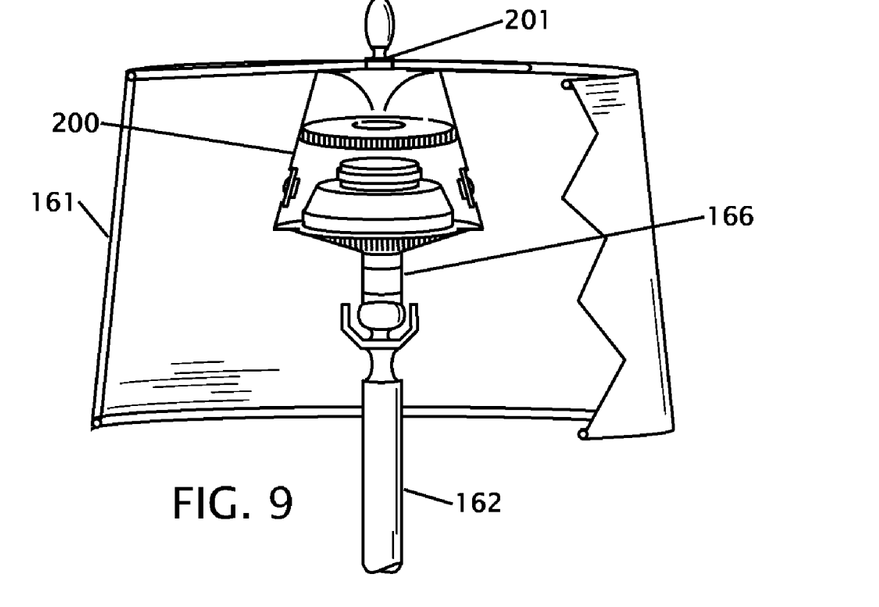
FIG. 9 shows a preferred embodiment of the light bulb speaker installed in the figure shown in FIG. 8.

FIG. 9 shows a preferred embodiment of the light bulb speaker installed in the figure shown in FIG. 8. This figure shows a general configuration of the speaker bulb 200 using the prior art threaded base 166 on the lamp base or fixture 162 and the lamp shade 161. Due to the larger size of the speaker bulb 200 the support member is combined into the lamp bulb 200. The LED illumination components create less heat. The top of the light speaker includes a threaded top member 201 for installation of the nut that secures the lamp shade. Detail of the components and structure of the speaker bulb are found in FIG. 10.

Figure 10:
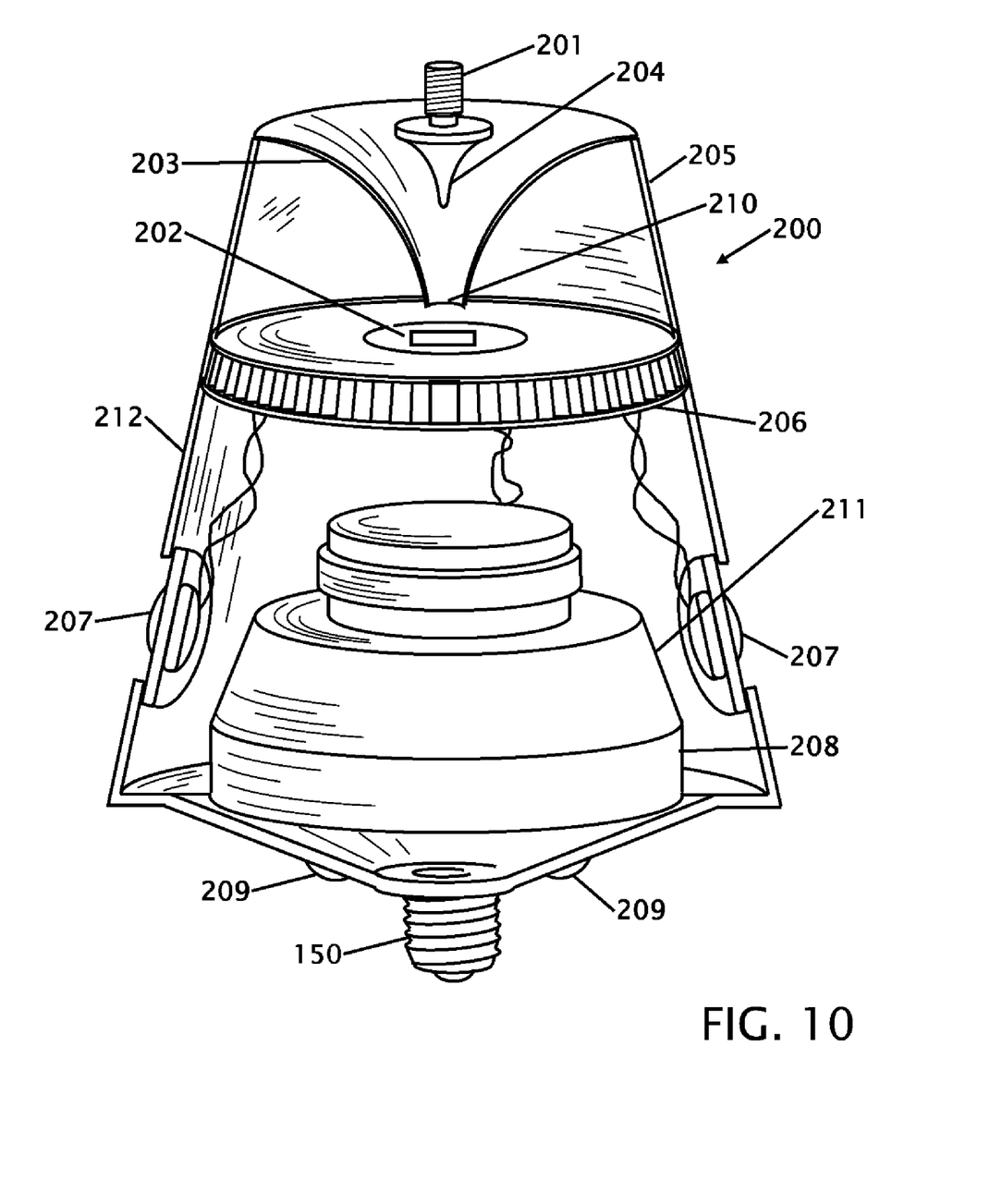
FIG. 10 shows a cross sectional view of the elements of the light bulb speaker from FIG. 9.

FIG. 10 shows a cross sectional view of the elements of the light bulb speaker from FIG. 9. This preferred configuration of the light sound bulb 200 maintains all of the light emitting aspects of a CFL or incandescent bulb with the use of the smallest number of LEDs possible. The threaded base of the bulb 150 is configured to be threaded into any existing threaded base that would support a standard incandescent light bulb. The heart of the design will be around a LED cluster 202 that contains one or a number of individual clustered LED's. In one embodiment a 10 Watt cluster LED is used but LED(s) with more or less intensity is contemplated.

A bugle-head reflector 203 will be centered over the LED cluster 202 so that a percentage of the light will pass through the center of the horn 203 to be broadcast against the ceiling and nearby surfaces. The surface area of the cluster LED 202 on the outside of the horn will reflect light from the uncovered portion 210 of the LED cluster 202 and direct it toward the shade (shown in FIG. 9). In one embodiment the uncovered portion 210 covers about ⅓ of the LED at the center, but other rations are contemplated. The shape of the horn 203 is parabolic and the surface curved could be determined by an exact math expression, which might be different for different size shades or shade shapes. The reflectors provide even light dispersion to simulate an even glow to the lamp shade. A transparent or frosted housing 205 allows the light to be sent or diffused through the light sound bulb 200.

This figure shows a second parabolic reflector 204 attached to the lampshade threaded top member 201 or "fitter" and is conceived to direct light away from the bottom of the fitter 201 and back into the main lighting stream to reduce light loss at the fitter.

A plurality of bottom emitting LED's 209 emit light from the underside of the sound light bulb to provide illumination for reading, hand work, hobbies or the like.

Area 206 provides a location for electronics. The housing 212 is made from plastic or heat dissipating metal to cool the electronics and or the LED elements. Tweeters 207 are mounted in the side wall 212. In the embodiment shown two opposing tweeters 207 are shown but more or less tweeters can be incorporated into the housing to provide an even dispersion of the sound from the tweeters and to minimize to directionality of the tweeters. A lower frequency midrange speaker 208 provides mid range sound. In the embodiments shown the midrange speaker is shown mounted to transmit sound downward, but other embodiments are contemplated. The housing provides a structural frame to connect the threaded base 150 to a lamp shade.

Figure 11:
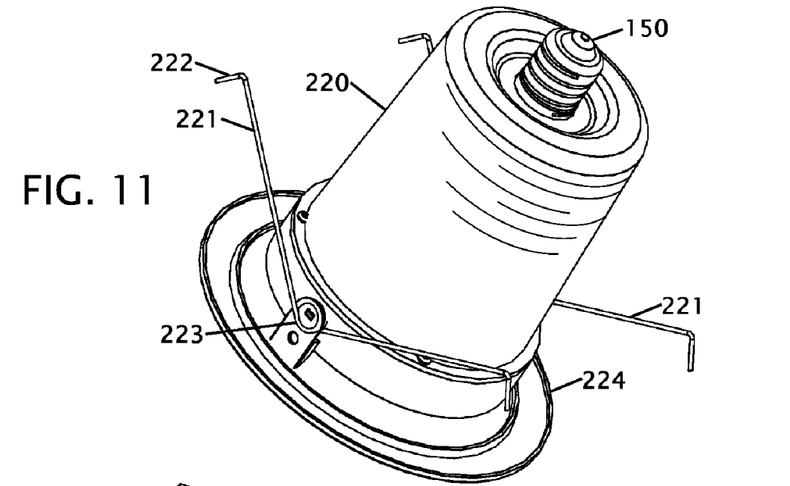
FIG. 11 shows a bottom perspective view of a screw-in can style light and sound bulb.

FIG. 11 shows a bottom perspective view of a screw-in can style light and sound bulb. From this figure, the threaded socket 150 is shown on the back of the housing 220. The housing 220 is shown as a solid tapered cylindrical unit, but it is contemplated that the shape can take a number of different configurations including but not limited to multiple sided shapes and open cage type designs. This figure shows retention arms 221 located on opposing sides of the housing 220 that will at least partially hold the light and sound bulb within a recessed can hole. The retention arms 221 help to reduce the loading on the threaded socket 150. A spring type bend 223 of the arms allows the retention arms 221 to be at least partially brought together or collapsed to fit into a standard can lighting recess. The end of the retention arms 221 have bent legs 222 to prevent the light and sound bulb from being dropped from an overhead hole. A cosmetic bezel 224 surrounds the housing 220 to provide a finished appearance of the screw-in can style light and sound bulb. The bezel 224 and the retention arms 221 are one contemplated embodiment and are not required in all installations and use. The screw-in can style light and sound bulb shown in FIG. 13 does not include the bezel or the retention arms.

Figures 12, 13:
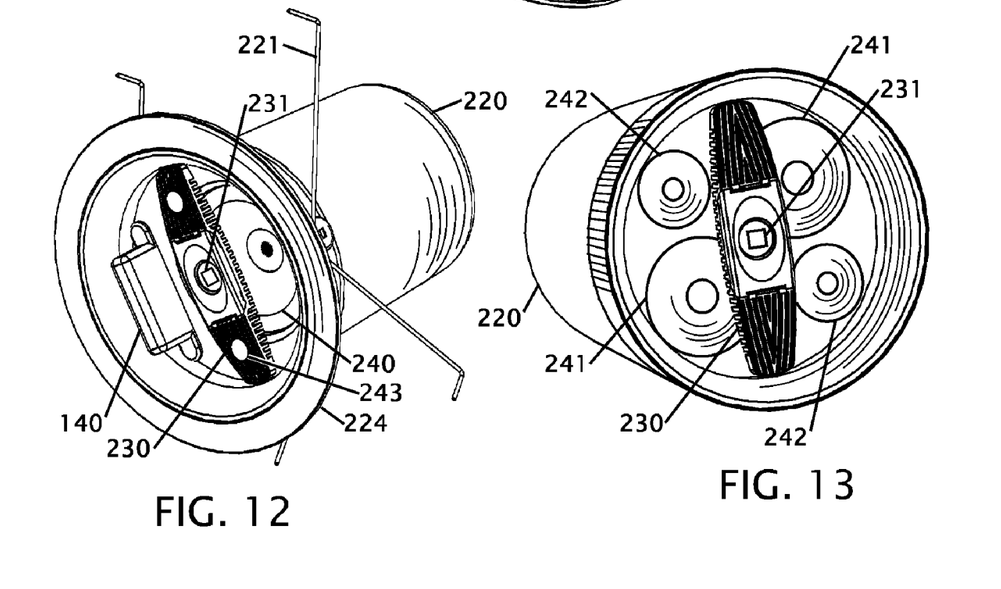
FIG. 12 shows a top perspective view of the screw-in can style light and sound bulb from FIG. 11.
FIG. 13 shows a top perspective view of another embodiment of the screw-in can style light and sound bulb from FIG. 11.

FIG. 12 shows a top perspective view of the screw-in can style light and sound bulb from FIG. 11. In this figure the screw-in can style light and sound bulb has a speaker 240 mounted within the housing 220. This speaker 240 can take a number of configurations including but not limited to a single speaker, coaxial, triaxial or a speaker with a wizzer cone. A bridge 230 is shown spanning across the housing 220. The bridge has an LED cluster light 231 to provide illumination. While an LED cluster light is shown, other types and styles of illumination elements are contemplated. The bridge 230 is constructed as a heat sink to provide cooling to the lighting element 231. It is also contemplated that the bridge 230 can have one or more higher frequency tweeter elements 243. The receiver 140 is shown extending from the housing. This configuration of screw-in light and sound bulb shows the retention arms 221 and the cosmetic bezel 224. An optically and or audio covering is optionally placed within the bezel 224 to cover and protect the inside of the screw-in light and sound bulb.

FIG. 13 shows a top perspective view of another embodiment of the screw-in can style light and sound bulb from FIG. 11. This configuration does not have retention arms or the cosmetic bezel. This configuration can be screwed directly into an existing can type lighting fixture where the existing can hardware provides the bezel and bezel retention. A bridge 230 is shown spanning across the housing 220. The bridge has an LED cluster light 231 to provide illumination. The bridge may be constructed for use with a plurality of individual LEDs that spread the light. The bridge 230 is constructed as a heat sink to provide cooling to the lighting element 231. This configuration shows multiple low frequency speakers 241 and multiple higher frequency speakers 242. The quantity and placement of the speakers is variable based upon the sound quality, volume and timbre. The receiver and or digital signal processor is located with the housing 220.

Thus, specific embodiments of a combination sound and light producing fixture and bulb have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A combination speaker lighting bulb comprising:
   at least one low voltage light emitting illumination element, in combination with at least one sound emitting element;
   a bugle-head light reflecting element that reflects light from said at least one light emitting illumination element onto an outer exterior surface of said bugle-head light reflector into a plurality of directions;
   an electrical connector configured for engage into a lighting socket, wherein
   said electrical connector provides power to said at least one low voltage illumination element and said at least one sound emitting element.

2. The combination speaker lighting bulb according to claim 1 wherein said bugle-head reflector has an opening at the apex of said bugle-head reflector.

3. The combination speaker lighting bulb according to claim 2 that further includes a horn that reflects illumination emitted through said opening.

4. The combination speaker lighting bulb according to claim 1 wherein said at least one light low voltage illumination element is configured proximate to said electrical connector to shine light from said electrical connector onto said light reflecting element.

5. The combination speaker lighting bulb according to claim 1 that further includes a digital signal processor to at least partially modulate a signal to said at least one sound emitting element.

6. The combination speaker lighting bulb according to claim 1 that further includes a wireless receiver to receive a wireless signal that is transmitted through said at least one sound emitting element.

7. A combination speaker lighting bulb comprising:
   an electrical base configured for insertion into a standard illumination base;
   a housing secured to said electrical base providing a structural support to a lamp shade;
   a power conversion circuit for converting electrical power from said electrical base into voltage to power at least one illumination element, a signal processor, an amplifier and at least one sound emitting element, wherein
   said signal processor at least partially modulates a signal to said sound emitting element.

8. The combination speaker lighting bulb according to claim 7 in which a plurality of sound emitting elements are utilized.

9. The combination speaker lighting bulb according to claim 7 that further includes a wireless receiver to receive said signal that is transmitted out of said at least one sound emitting element.

10. The combination speaker lighting bulb according to claim 7 that further includes a wireless receiver to receive a wireless signal that is transmitted through said at least one sound emitting element.

11. A combination speaker lighting bulb comprising:
    an electrical base configured for insertion into a standard illumination base;
    a housing having a back end secured to said electrical base providing a structure to support at least one illumination element and at least one sound producing element;
    said housing having a front end with said at least one sound producing element;
    a digital signal processor at least partially modulating a signal to said at least one sound emitting element, and
    said front end further having at least one light producing element located in front of said at least one sound producing element.

12. The combination speaker lighting bulb from claim 11 wherein said at least one illumination element is secured to said housing with a connection mechanism that spans above said at least one sound producing element.

13. The combination speaker lighting bulb from claim 12 wherein said securing to said housing spans across the sides of said housing and over said at least one sound producing element.

14. The combination speaker lighting bulb from claim 13 wherein said securing further includes a heat sink.

15. The combination speaker lighting bulb from claim 11 wherein said at least one light producing element is a cluster LED.

16. The combination speaker lighting bulb according to claim 11 in which said electrical base is an intermittent, medium, candelabra, bayonet or a pin type base.

17. The combination speaker lighting bulb according to claim 11 that further includes a wireless receiver to receive a signal that is transmitted out of said at least one sound emitting element.

18. The combination speaker lighting bulb according to claim 11 wherein said at least one sound producing element is mechanically adjustable to change a direction of sound transmission.

* * * * *